(12) United States Patent
Gidra et al.

(10) Patent No.: US 11,074,179 B2
(45) Date of Patent: Jul. 27, 2021

(54) MANAGING OBJECTS STORED IN MEMORY

(71) Applicant: Hewlett Packard Enterprise Development LP, Houston, TX (US)

(72) Inventors: Lokesh Gidra, Palo Alto, CA (US); Evan R Kirshenbaum, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 722 days.

(21) Appl. No.: 15/802,082

(22) Filed: Nov. 2, 2017

(65) Prior Publication Data

US 2019/0129845 A1  May 2, 2019

(51) Int. Cl.
*G06F 12/02* (2006.01)

(52) U.S. Cl.
CPC ........ *G06F 12/0261* (2013.01); *G06F 12/023* (2013.01); *G06F 12/0253* (2013.01); *G06F 12/0269* (2013.01); *G06F 2212/1016* (2013.01); *G06F 2212/1044* (2013.01); *G06F 2212/702* (2013.01); *G06F 2212/7205* (2013.01)

(58) Field of Classification Search
CPC ............. G06F 12/0261; G06F 12/023; G06F 12/0253; G06F 12/0269; G06F 2212/702; G06F 2212/7205; G06F 2212/1044; G06F 2212/1016
See application file for complete search history.

(56) References Cited

U.S. PATENT DOCUMENTS

| 7,711,920 B2 | 5/2010 | Borman et al. |
| 7,937,378 B2 | 5/2011 | Shavit et al. |
| 8,631,051 B2 | 1/2014 | Pizlo |
| 2003/0084266 A1* | 5/2003 | Knippel ............... G06F 12/023 711/173 |
| 2004/0221120 A1* | 11/2004 | Abrashkevich ....... G06F 12/023 711/170 |
| 2006/0190697 A1 | 8/2006 | Grant |

OTHER PUBLICATIONS

Cohen, N. et al., Automatic Memory Reclamation for Lock-free Data Structures, (Research Paper), Oct. 2015, 20 Pgs.
Kliot, G. et al., A Lock-free, Concurrent, and Incremental Stack Scanning for Garbage Collectors, (Research Paper), Mar. 2009, 10 Pgs.
Unknown, Memory Allocation, Manual Reclamation, 2017, 5 Pgs.
Maurice Herlihy et al, The Art of Multiprocessor Programming, Revised Reprint 1st Edition, May 22, 2012, Chapter 14, pp. 329-350.

* cited by examiner

*Primary Examiner* — Kalpit Parikh
(74) *Attorney, Agent, or Firm* — Hewlett Packard Enterprise Patent Department

(57) ABSTRACT

A method for managing objects stored in memory is presented. The method may include receiving, by a memory allocator in a garbage collected system, a first free memory chunk. The method may include creating a node to associate with the first free memory chunk and ensuring that a first memory region containing the node will be considered to be free memory during a sweeping phase of the garbage collected system.

20 Claims, 7 Drawing Sheets

MANAGING OBJECTS STORED IN MEMORY

BACKGROUND

The data accessed within a computer system may comprise a set of objects (also known as records, structures, instances, or data values) stored in the memory or storage of the computer system. Access to objects may be by use of pointers (also known as references or links) that contain sufficient information to identify the object they refer to. This information may include a memory address of the object, an offset of a memory address of the object relative to a base address, a key that can be looked up in a table, or other information.

Garbage collection is a type of memory management where a garbage collector reclaims memory occupied by objects that are no longer in use. Garbage collection may be used and/or required by certain programming languages. In a system that employs garbage collection (GC), some objects may be allocated on a heap managed by a garbage collector by an allocator. The allocator may receive a request to allocate memory for one or more objects, where the allocation request may be associated with a size of memory sufficient to contain the object or objects. When an object is allocated, the allocator may identify an unused range of memory addresses (or otherwise characterized memory or storage region) on the heap, and that region of memory may be used to create the object and contain its data.

The job of the garbage collector is to identify regions of memory within the heap that are known to not contain any reachable objects, where an object is considered to be reachable if it would be possible for any application thread within any current or future executing process using the heap to obtain a pointer to the object, and to return the memory in such regions to the allocator for use in allocating new objects. Regions of memory within the heap that do not contain reachable objects may be called "garbage regions" or "garbage ranges". Identifying garbage regions may involve identifying allocated objects that are or may be reachable objects and determining that the space occupied by such reachable objects is not part of any garbage region.

BRIEF DESCRIPTION OF THE DRAWINGS

The following detailed description references the drawings, wherein.

DETAILED DESCRIPTION

Systems and methods described herein provide an allocator for a garbage collector that is implemented using a node list data structure. The node list data structure used by the allocator may be (a) stored within the heap managed by the garbage collector, (b) used to efficiently obtain the smallest free chunk of at least the desired size, and (c) seen as garbage by the garbage collector and therefore automatically collected each GC cycle.

Garbage collection may include collecting memory previously allocated to the objects that are no longer reachable and making the memory available for future allocation. A garbage collector may consider an object "reachable" if it is pointed to by a "root pointer" stored in a well-known space, such as a thread execution stack or global variable, or, recursively, if it is pointed to by a pointer stored within an identified reachable object, and the garbage collector may collect the memory occupied by objects once the objects become unreachable, where collected memory is made available to satisfy future requests to allocate objects.

Garbage collection may comprise several activities that are performed sequentially or in parallel. When processed sequentially, these activities may be called "phases". For example, a garbage collector may perform a marking phase (also known as a "tracing phase"), in which the reachability of objects on the heap are identified. An example marking phase where different colors are used for different reachability statuses is discussed in further detail below. A garbage collector may also perform a "sweeping phase", in which regions of memory determined to not contain reachable objects (during the marking phase) are made available for the satisfaction of subsequent requests to allocate objects. Garbage collection activities may be performed in a cyclic manner, where the performance of the activities in one garbage collection cycle is followed by the performance of the activities in the next cycle. For example, if a garbage collection cycle comprises a marking phase followed by a sweeping phase, then the sweeping phase of cycle 1 may be followed by the marking phase of cycle 2.

A method for managing objects stored in memory is presented herein. The method may include receiving, by a memory allocator in a garbage collected system, a first free memory chunk. The method may include creating a node to associate with the first free memory chunk and ensuring that a first memory region containing the node will be considered to be free memory during a sweeping phase of the garbage collected system.

Figure 1:
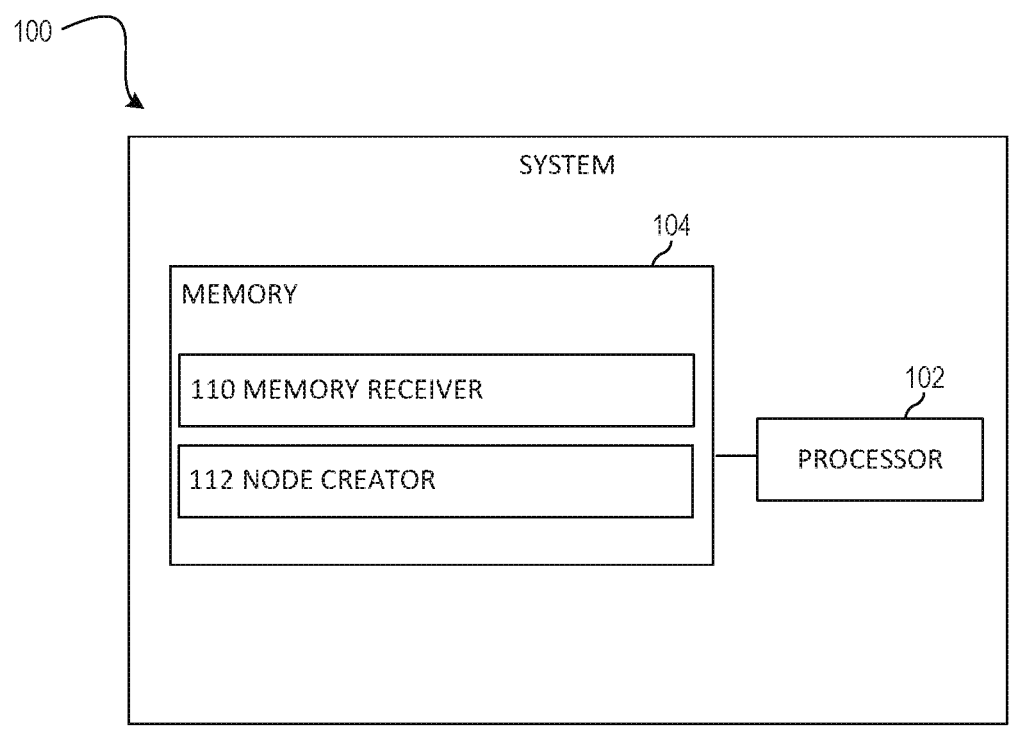
FIG. 1 is a block diagram of an example system in which managing objects stored in memory may be useful.

FIG. 1 is a block diagram of an example system 100 in which managing objects stored in memory may be useful. System 100 may include a processor 102 and a memory 104 that may be coupled to each other through a communication link (e.g., a bus).

Processor 102 may include a Central Processing Unit (CPU), a Graphics Processing Unit (GPU), or another suitable processor. In some examples, memory 104 stores machine readable instructions executed by processor 102 as well as data used by programs executed by processor 102. Memory 104 may include any suitable combination of volatile and/or non-volatile memory, such as combinations of Random Access Memory (RAM), Read-Only Memory (ROM), memristor memory, spin-transfer torque memory, flash memory, and/or other suitable memory. Memory 104 may also include storage on non-volatile storage devices such as disks or solid-state devices (SSD). Processor 102 may include multiple cores. Processor 102 may also comprise multiple processors. System 100 may include multiple physical devices, which may be connected by a network, bus, photonic link or otherwise. Each of these physical devices may contain part of memory 104 and/or processor 102.

A portion of the memory may be designated as a heap, which may be used for the allocation of objects. The memory which includes the heap may be or may contain non-volatile memory and persistent memory such as flash memory, resistive memory, phase change memory, spin-transfer torque memory, or memristor memory. The heap may also be or may contain volatile memory such as dynamic random-access memory (DRAM), which may be made non-volatile by ensuring that modifications to the volatile memory are reflected in a non-volatile memory or a storage device such as a hard disk drive (HDD) or solid-state device (SSD) drive in the case of a loss of power. In some examples, volatile memory may be considered to be non-volatile while it retains power. The size of the heap may be of various sizes, including multiple hundreds of terabytes, petabytes or larger and may contain a very large number of allocated and reachable objects. In order to have a garbage collector that does not unacceptably affect the performance of applications using such a heap, it may be important to use a garbage collection technique that does not interrupt the application threads' progress at all, or interrupts the application threads' progress for a constant time period that is shorter than and not proportional to the time that would be required to visit all allocated or reachable objects or all memory locations in the heap. An example of such a garbage collection technique may be one that guarantees a maximal pause to an application thread that is proportional to the thread's program stack size.

Memory 104 may store instructions to be executed by processor 102 including instructions for a memory receiver 110, a node creator 112, and/or other components. According to various implementations, system 100 for using pointers in a memory managed system may be implemented in hardware and/or a combination of hardware and programming that configures hardware. Furthermore, in FIG. 1 and other Figures described herein, different numbers of components or entities than depicted may be used. Processor 102 may execute memory receiver 110 to receive, by a memory allocator in a garbage collected system, a first free memory chunk. A shared pool of memory, including the first free memory chunk, may be accessible by a plurality of operating system processes. The memory allocator and each operating system process in the plurality of operating system processes execute their own memory allocation process. Processor 102 may execute node creator 112 to create a node to associate with the first free memory chunk.

As discussed above, the system may use a node list that associates different memory chunk sizes with sets of memory chunks having the associated sizes. The node list may be implemented using a data structure similar to a lock-free skip list. The node list may be implemented as a linked list of nodes, where each node contains a key and associated value, and where the nodes are ordered by key. For example, in system 100, the keys may be chunk sizes and the values may be lock-free stacks of free memory chunks of the given size. Each node may contain k>0 pointers to following nodes (nodes with the numerically higher keys, if such exist), where different nodes may have different values for k (up to some fixed maximum), chosen at node creation time, and the $i^{th}$ pointer in a node may point to the next node (e.g., the node with next higher key) that has at least i pointers. The value of k associated with a node may be called the height of the node, and k pointers may be called height-indexed pointers to successor nodes, where the $i^{th}$ pointer may be called the height-indexed pointer with index height i.

The values of k may be chosen randomly by selecting from an inverse exponential distribution, which may result in their being twice as many k=1 nodes as k=2 nodes, twice as many k=2 nodes as k=3 nodes, and so on. The node list may also have a sentinel node of maximal height and a key less than any possible key.

To find a node containing chunks of a target size, the sentinel node may be identified as the current node and the maximal height index may be identified as the current index. The current node may be replaced by following the current index pointer at the current node if a node is reached having a key that is less than or equal to the target and whose next pointer at the current index does not point to a node or which points to a node whose key is greater than the target. If the key is equal, then the current node may be considered to be the result of the search. Otherwise, the current index may be reduced by one and the search may proceed from the current node. Eventually, a node whose key matches the target will be found or the search will reach the lowest level, at which point it can be determined that no node whose key matches the target is contained in the node list. In the latter case, the node following the current node may be identified as the node containing the smallest chunks that are large enough to satisfy the request.

To insert a memory chunk into the node list (e.g., to add the memory chunk to a node in the node list whose key is equal to the size of the memory chunk, a similar search may be performed with the target size of the memory chunk, but in this search the nodes at each height whose keys are numerically less than the desired chunk size may be remembered. If the result of the search is a node whose key is equal to the chunk size, the chunk may be pushed onto the value stack of the identified node using a compare-and-swap (CAS) operation, which atomically sets a variable to a provided desired value if and only if the variable's current value at the time of the modification is a provided expected value. If the value is not the expected value, no modification takes place and the operation returns an indication of the variable's current value. For the node list, a free chunk may be considered to have a pointer to the next free chunk in its node's stack, and the node's value may be the first free chunk in the stack (the stack head). To push the chunk onto the stack, the current value of the stack head may be read, and this value may be set as the next free chunk in the chunk to be added. Then a CAS may be attempted to change the stack head from the previously read value to the new chunk. If this attempt fails, the next free chunk pointer in the free chunk to be added may be updated to point to the current value of the stack head, and the process may be repeated until it succeeds.

If the result of the search is not a node whose key is equal to the chunk size, a new k may be selected (e.g., by drawing from a random distribution) and a new node may be created with a stack having the free chunk to be added as its only member. At each level i, from the lowest up to k, the new node may be spliced into the node list by setting the new node's $i^{th}$ pointer to the value of the $i^{th}$ pointer of the $i^{th}$ remembered node and using a CAS operation to change the value of the $i^{th}$ pointer of the $i^{th}$ remembered node from the previously read value to a pointer to the new node. If the CAS operation fails the next action may depend on whether the new value points to a node with chunks less than or equal to the target size or greater than the target size. If the new pointer points to a node whose chunk size is greater than the target size, the $i^{th}$ pointer of the new node may be updated to this pointer and the CAS may be re-attempted. If the new pointer points to a node whose chunk size is less than or equal to the target size, the $i^{th}$ remembered node may be updated by following these pointers as in the original search. If the resulting $i^{th}$ remembered node has a chunk size equal to the target, the chunk to be added may be pushed onto its stack and the newly created node may be discarded. Otherwise, the $i^{th}$ pointer of the new node may be updated to the $i^{th}$ pointer of the $i^{th}$ remembered node and the CAS may be re-tried.

In some examples, a node may contain memory chunks of more than a single size and the node's key may be a number (or other identifier) sufficient to determine that a given node is the sole (or an) appropriate node in the node list for chunks of a given size. In some examples, a node may use a data structure other than a stack to manage its associated collection of memory chunks.

When each node contains memory chunks of one size, an allocating thread may be able to determine before removing a chunk from an identified node that the chunk it will get will be sufficiently large. Since the node list keeps its elements in order, it may be efficient for the allocating thread to find the node corresponding to the smallest available chunks that will suffice, which may reduce memory fragmentation.

Node creator 112 may allocate memory for newly created nodes from free memory chunks held by the allocator as described below. The node creation and insertion process may ensure that nodes are never pointed to by pointers that will be traced within allocated objects, and the node creation process may ensure (e.g., by failing to add information that would identify a node as a valid object) that any pointers to nodes in root pointer locations will not be considered to point to reachable objects. In this way processor 102 may ensure that created nodes will not be identified as live objects during a subsequent tracing phase of the garbage collected system and that these nodes will be considered to be free memory during a subsequent sweeping phase of the garbage collected system and the memory regions they occupy will be returned to the allocator.

An allocator may also contain a distinguished free memory chunk which may be used both to allocate memory regions for nodes and also to allocate memory regions for objects when no other free memory chunk in the node list is large enough for the allocation. The allocator may also contain two pointers to the ends of the distinguished free memory chunk: the object allocation end (e.g., the lowest memory address in the distinguished chunk) and the node allocation end (e.g., the highest memory address in the distinguished chunk). These pointers may be situated such that they may be modified atomically as a unit, e.g., by a CAS operation. The allocator may further contain the original value of the node allocation end pointer as of the time the distinguished chunk was added to the allocator. The distinguished chunk may be the sole free chunk in a node constrained to be at the end of the node list. Alternatively, it may be elsewhere.

System 100 may contain two allocators (or one allocator having two sets of data), each used during alternate cycles of the garbage collector. At any point, one allocator may be considered to be the current allocator and the other the previous allocator. The two allocators may swap roles at the beginning of a GC cycle's sweep phase.

During the sweep phase, once the role swap has taken place and application threads are no longer allocating from the previous allocator, the garbage collector may expand the distinguished chunk by identifying the end of the first marked object before the object allocation end and by identifying the beginning of the first marked object after the original node allocation end. This expanded chunk may be used as the distinguished chunk for the new current allocator. Alternatively, another free chunk other than the previous distinguished chunk may be expanded and used. In a newly created heap, the entirety of the memory assigned to the heap may be considered to be the distinguished chunk. Alternatively, nodes containing chunks of preselected sizes may be preallocated and combined to form an initial node list, and the remainder may be considered to be the distinguished chunk.

To allocate memory for a node, the node allocation end pointer may be adjusted by subtracting out the desired amount of memory (e.g., specified in words or bytes). The identified memory region may be taken to be the region beginning just past the new value of the node allocation end pointer. To allocate memory for an object, the object allocation end pointer may be adjusted by adding the desired amount of memory. The identified memory region may be taken to be the region ending just before the new value of the object allocation end pointer. When either end pointer is modified, the modification may be performed using a CAS operation to ensure that neither has changed since it was last read and that the resulting pointer value would not result in the space between the object allocation end pointer and the node allocation end pointer being less than some minimum. If this would be the case, another large free memory chunk may be removed from the node list and installed as a new distinguished free memory chunk. By allocating nodes in this way and by ensuring that nodes will not be marked during the tracing phase, nodes allocated from a single distinguished chunk will form a contiguous block of garbage in the next sweep phase and will be collected into a single free memory chunk, which may reduce fragmentation.

Figure 2:
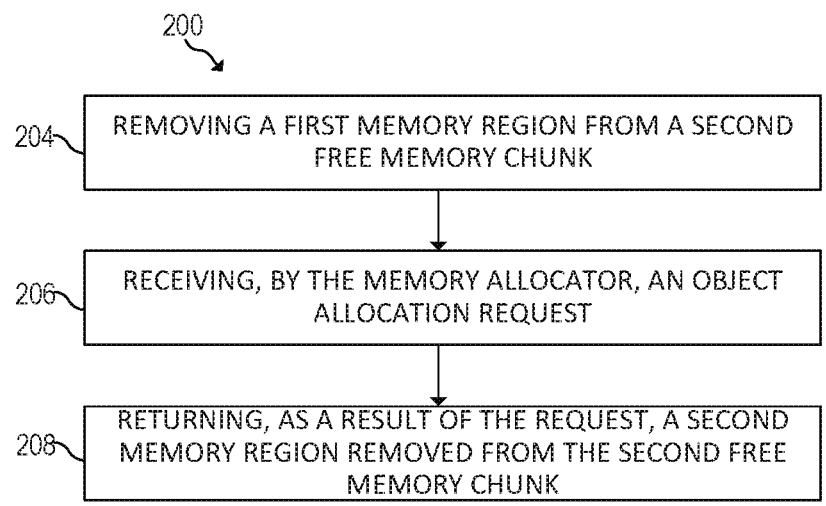
FIG. 2 is a flowchart of an example method for returning a memory region removed from a memory chunk.

In some aspects, creating the node to associate with the first free memory chunk may include removing a first memory region from a second free memory chunk (e.g., the distinguished memory chunk). Turning briefly to FIG. 2, a method 200 is presented for returning a memory region removed in satisfaction of an object allocation request. Method 200 may be described below as being executed or performed by a system, for example, system 100 of FIG. 1 or system 700 of FIG. 7. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate examples of the present disclosure, at least one step of method 200 may be executed substantially concurrently or in a different order than shown in FIG. 2. In alternate examples of the present disclosure, method 200 may include more or fewer steps than are shown in FIG. 2. In some examples, at least one of the steps of method 200 may, at certain times, be ongoing and/or may repeat.

At block 204, the method may include removing a first memory region from the second free memory chunk to use to store the created node. As described above, removing the first memory region may comprise changing an indication of a node allocation end of the second free memory chunk. At block 206, the method may include receiving, by the memory allocator, an object allocation request associated with a memory size. At block 208, the method may include returning, as a result of the request, a second memory region removed from the second free memory chunk. Removing the second memory region may comprise changing an indication of an object allocation end of the second free memory chunk. In this way, both nodes and objects may be placed in memory regions removed from the same free memory chunk. Although presented in a particular sequence, block 204 may alternatively be executed in parallel with, between, or after blocks 206 and 208. Block 204 may also be executed in furtherance of the attempt to satisfy the object allocation request received at block 206.

Turning again to FIG. 1, the system 100 may provide an allocate operation, to remove and return a memory region from a free memory chunk in the allocator, and an insert operation, to add a free memory chunk to the allocator. An allocate operation invocation may be associated with a requested memory size, which is an indication of a desired size of the memory region to return. The allocate operation may utilize the find (or search or lookup) operation as described above to identify a node in the node list associated with the smallest chunk size greater than or equal to the requested size. If a node is identified, but the node is associated with an empty stack of free memory chunks, the next node (e.g, the node pointed to by the lowest level next pointer in the identified node) may be considered until a node is identified with a non-empty stack. If a node associated with a non-empty stack is identified, a pop operation (e.g., by means of a CAS operation in a loop) may be employed to remove a free memory chunk from the identified node. If the result of the pop operation is that the node's stack is discovered to be empty, subsequent nodes may be considered. If the allocate operation is unsuccessful in popping a free memory chunk, a memory region may be removed from the object allocation end of the distinguished memory chunk as described above. If a free memory chunk is popped off but the size of the free memory chunk is in excess of that needed to satisfy the allocation request, the free memory chunk may be partitioned, with one portion constituting the free memory region to return and another portion used to create a new free memory chunk that is added to the allocation by means of the insert operation. An allocating thread may ensure that all memory regions in a partitioned chunk carry an indication of the chunk size, e.g., within their first word.

To reduce fragmentation, when the allocate operation is unable to find a chunk of precisely the desired size (e.g., because no corresponding node is discovered in the node list or because the discovered node has an empty stack of free chunks), before considering subsequent nodes, the allocating thread may attempt to find a free memory chunk whose size is a multiple of the desired size, in expectation of future allocation requests for objects of that size, or a free memory chunk of some other larger size, such as a "slab" of, e.g., 4,096 words. This excess memory in the returned memory region may be stored by the allocating thread's thread-local allocator, as described below. This may reduce fragmentation, especially when the remainder portion that would have been returned to the allocator is small enough that it is unlikely to be sufficiently large to satisfy a subsequent allocation request.

The insert operation may be used to add a free memory chunk to an appropriate node in the node list, as described above, which may result in the creation of a new node. The insert operation may be invoked in performance of the allocate operation as described above, and it may be invoked during the sweep phase when garbage regions are identified to add these regions to the allocator.

Figure 3:
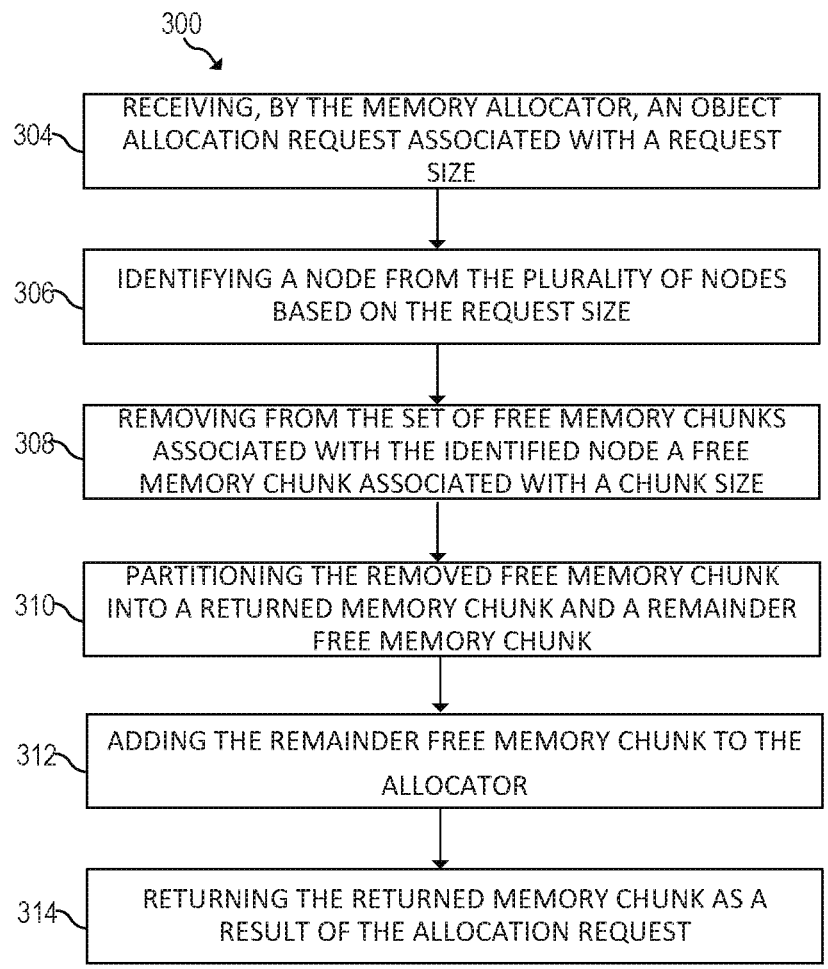
FIG. 3 is a flowchart of an example method for allocating memory.

Turning now to FIG. 3, a method for allocating memory is presented. Method 300 may be described below as being executed or performed by a system, for example, system 100 of FIG. 1 or system 700 of FIG. 7. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, at least one step of method 300 may be executed substantially concurrently or in a different order than shown in FIG. 3. In alternate examples of the present disclosure, method 300 may include more or fewer steps than are shown in FIG. 3. In some examples, at least one of the steps of method 300 may, at certain times, be ongoing and/or may repeat.

The method may begin at block 304, where the method 300 may include receiving, by the memory allocator, an object allocation request associated with a request size. At block 306, the method may include identifying a node from the plurality of nodes based on the request size. At block 308, the method may include removing from the set of free memory chunks associated with the identified node a free memory chunk associated with a chunk size. At block 310, the method may include partitioning the removed free memory chunk into a returned memory chunk and a remainder free memory chunk. At block 312, the method may include adding the remainder free memory chunk to the allocator. At block 314, the method may include returning the returned memory chunk as a result of the allocation request.

Figure 4:
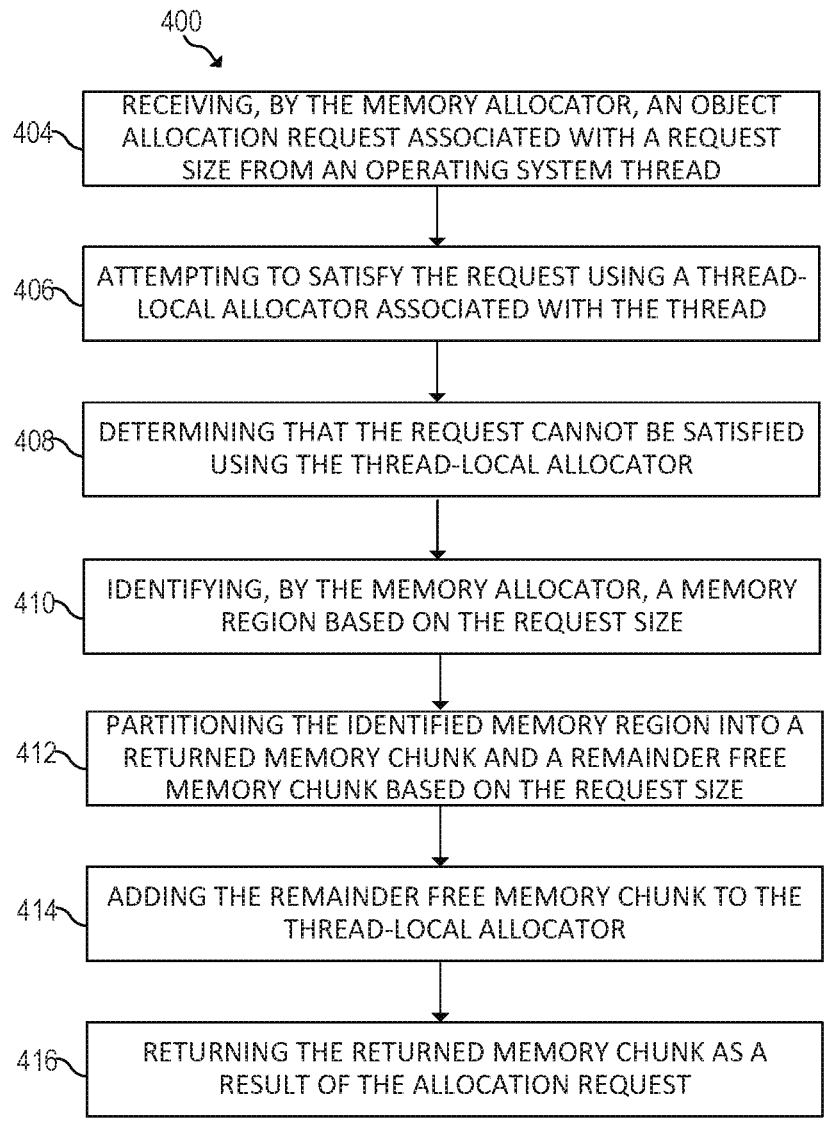
FIG. 4 is a flowchart of another example method for allocating memory.

Turning now to FIG. 4, a method for allocating memory is presented. Method 400 may be described below as being executed or performed by a system, for example, system 100 of FIG. 1 or system 700 of FIG. 7. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, at least one step of method 400 may be executed substantially concurrently or in a different order than shown in FIG. 4. In alternate examples of the present disclosure, method 400 may include more or fewer steps than are shown in FIG. 4. In some examples, at least one of the steps of method 400 may, at certain times, be ongoing and/or may repeat.

The method may begin at block 404, where the method may include receiving, by the memory allocator, an object allocation request associated with a request size from an operating system thread. At block 406, the method may include attempting to satisfy the request using a thread-local allocator associated with the thread. A thread-local allocator may be associated with a single thread and not shared among other threads. The allocating thread's thread-local allocator may be efficient to use because its non-shared nature may mean that contention in its data structures between the allocating thread and other threads may not be a concern and neither mutual exclusion mechanisms (e.g., locks or mutexes) or lock-free techniques (e.g., CAS operations) may need to be employed. A thread-local allocator may be implemented using an ordered map data structure such as the C++ std::map class. This ordered map may associate free chunk sizes with collections (e.g., lists or sets) of free chunks of the associated size. To attempt to satisfy the allocation request, the allocating thread may query the map for the collection of chunks of the smallest size sufficient to satisfy the request. If there is no such collection, the allocation request cannot be satisfied using the thread-local allocator. If the collection is of free chunks of the desired size, one free chunk may be removed from the collection and returned (or the memory region corresponding to the free chunk may be returned) as the result of the allocation request. If the removal of the free chunk renders the collection empty, the association between the chunk size and the now-empty collection may be removed from the thread-local allocator. If the collection is of free chunks of a larger size, one free chunk may be removed and partitioned into a memory region of the desired size, which may be returned as the value of the allocation request, and the remainder may form a new free chunk of a smaller size which may be added to the collection in the thread-local allocator's map associated with the smaller size. When the allocating thread receives an indication that the previous and current allocators are to swap roles, the thread-local allocator may be cleared of its association between chunk size and free memory chunks.

In some aspects, the request may not be satisfied using the thread local allocator. Accordingly, at block 408, the method may include determining that the request cannot be satisfied using the thread-local allocator. At block 410, the method may include identifying, by the memory allocator, a memory region based on the request size as described above. At block 412, the method may include partitioning the identified memory region into a returned memory chunk and a remainder free memory chunk based on the request size. At block 412, the method may include adding the remainder free memory chunk to the thread-local allocator, and at block 414, the method may include returning the returned memory chunk as a result of the allocation request.

To improve performance when finding nodes in the node list, each allocating thread may employ a thread-local map associating chunk sizes with nodes discovered during lookup operations during the current GC cycle. Since threads typically allocate many objects of the same size, this thread-local map may allow an allocating thread to bypass all or part of the linear scan when it has previously observed and remembered nodes containing chunks of the desired size or a nearby smaller size. This thread-local map may be updated whenever a node is found during a lookup or insert operation, including when the allocating thread creates new nodes. When the allocating thread receives an indication that the previous and current allocators are to swap roles, the thread-local map may be cleared.

To improve performance, the allocator may maintain an array of pointers to nodes of small free chunk size (e.g., for chunk sizes up to 1,000 words), with the position in the array determined by the size of the chunks in the node. This array may be shared among all threads in system 100 or among a subset of threads associated with a single operating system process. When a sufficiently small chunk is requested, the appropriate position in the array may be consulted and if it contains a non-null pointer, the pointed-to node may be used. If both the thread-local map described above and the shared array are employed, the map may be consulted first and the array utilized if the thread-local map does not have a reference to a node holding the correct size chunks. In such case, if a node is found in the array, it may be added to the thread-local map. Whenever an insert operation creates a node containing sufficiently small chunks and this node is added to the node list, a pointer to the node may be added to the array, and whenever an allocate operation identifies a node containing sufficiently small chunks where this node is not contained in the array, a pointer to the node may be added to the array. These additions may be done without resort to locks or CAS operations, as any thread that attempts to modify the array may be guaranteed to modify it to the same value. At a time when the allocator is a previous (e.g., not current) allocator for a GC cycle, the pointers in the array may be replaced by null pointers.

When an inverse exponential distribution is used to select node heights k, it may be observed that approximately ½ of the nodes have k=1, approximately ¼ of the nodes have k=2, and so on up to, when the maximal height is, e.g., k=10, 1/1,024 of the nodes being of maximal height. Based on this, it may be observed that the process of searching for the node beginning with the sentinel consists of an initial linear phase during which maximal height nodes are enumerated followed by a second phase during which smaller height nodes are enumerated. Due to the distribution, it may be expected that this second phase will enumerate, on average one node per height, but when the node list contains a large number of nodes, the initial linear phase may take a significant amount of time. To improve performance during this initial linear phase, each thread may maintain a thread-local ordered map associating chunk size to the maximal-height nodes it has seen during the current GC cycle. When performing the linear phase, it may begin with the maximal-height node it has seen whose chunk size is less than the desired size. When the allocating thread receives an indication that the previous and current allocators are to swap roles, the thread-local map may be cleared.

Figure 5:
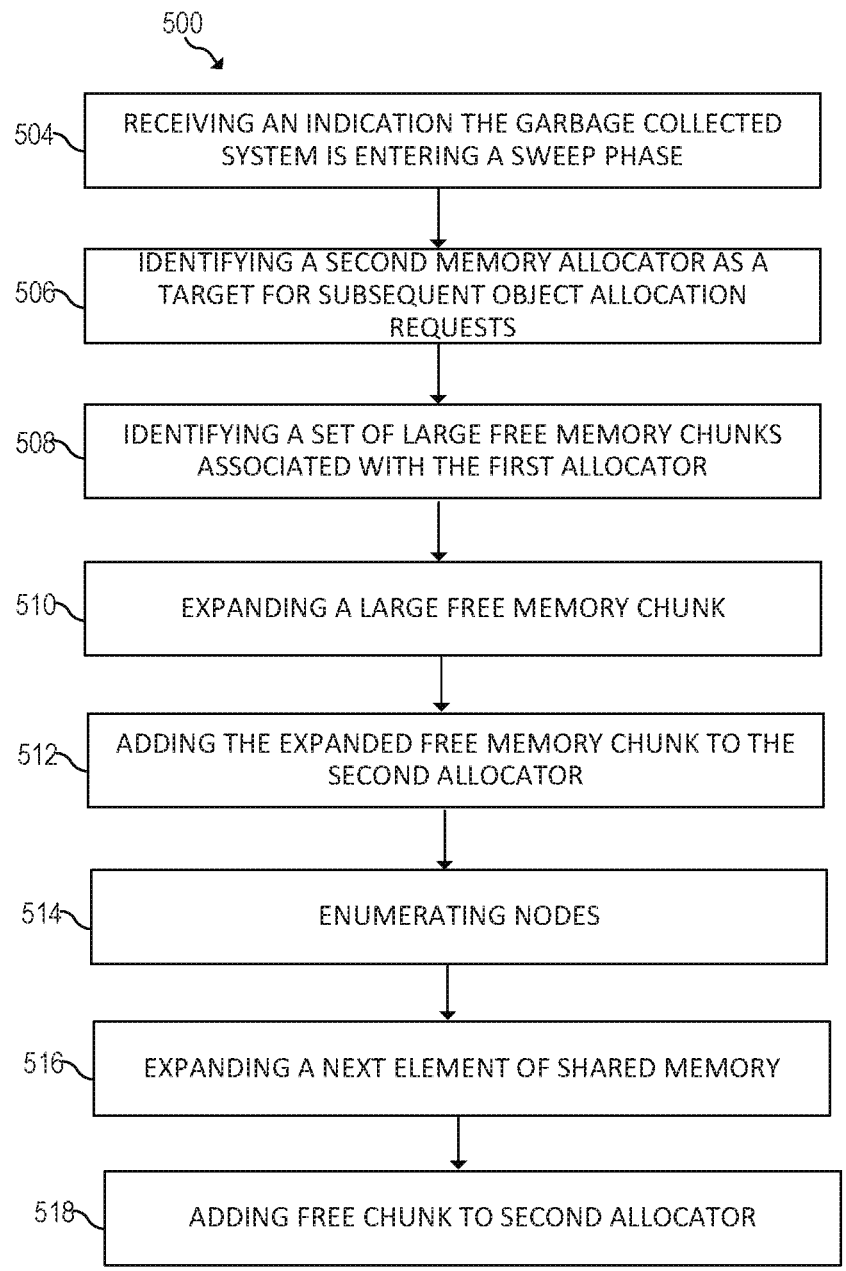
FIG. 5 is a flowchart of an example method for creating an allocator.

Turning now to FIG. 5, a method 500 for populating an allocator is presented. Method 500 may be described below as being executed or performed by a system, for example, system 100 of FIG. 1 or system 700 of FIG. 7. Other suitable systems and/or computing devices may be used as well. Method 500 may be implemented in the form of executable instructions stored on at least one machine-readable storage medium of the system and executed by at least one processor of the system. Alternatively or in addition, method 500 may be implemented in the form of electronic circuitry (e.g., hardware). In alternate examples of the present disclosure, at least one step of method 500 may be executed substantially concurrently or in a different order than shown in FIG. 5. In alternate examples of the present disclosure, method 500 may include more or fewer steps than are shown in FIG. 5. In some examples, at least one of the steps of method 500 may, at certain times, be ongoing and/or may repeat.

At block 504, the method may include receiving an indication the garbage collected system is entering a sweep phase. At block 506, the method may include identifying a second memory allocator (e.g., the prior previous allocator) as a target for subsequent object allocation request. At block 508, the method may include identifying a set of large free memory chunks associated with the first allocator. For example, the distinguished chunk may be identified and nodes in the node list may be enumerated in reverse order of chunk size until a specified number of free chunks have been identified. At block 510, the method may include expanding these large free memory chunks by identifying maximal garbage regions preceding and following each of them. At block 512, the method may include adding the expanded free memory chunks to the second allocator. In some embodiments, this method may be performed by a plurality of operating threads (e.g., a plurality of garbage collection threads) which may be associated with a plurality of operating system processes. The plurality of threads may share a large free memory chunk array. At block 514, nodes may be enumerated in a deterministic order that is the same for all of the plurality of threads, and this order may be used to establish the content of the large free memory chunk array. The cooperating threads may each, at block 516, expand a next element of the shared large free memory chunk array, ensuring that multiple threads do not, at block 518, add the same free memory chunk to the second allocator.

Figure 6:
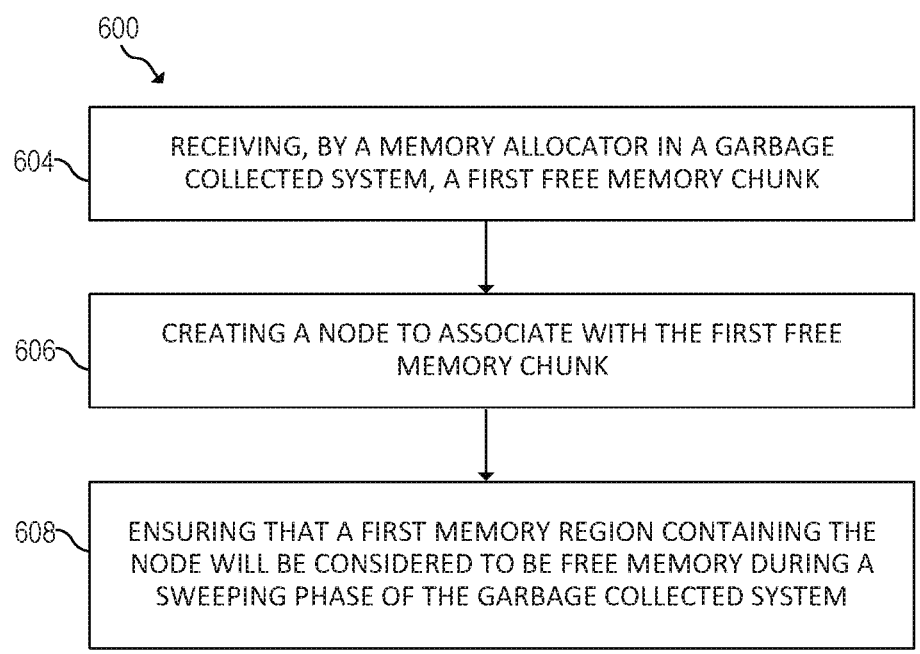
FIG. 6 is a flowchart of an example method for managing objects stored in memory.

Turning now to FIG. 6, a flowchart of an example method 600 for managing objects stored in memory is described. Method 600 may be described below as being executed or performed by a system, for example, system 100 of FIG. 1 or system 700 of FIG. 7. Other suitable systems and/or computing devices may be used as well. Method 600 may be implemented in the form of executable instructions stored on at least one machine-readable storage medium of the system and executed by at least one processor of the system. Alternatively or in addition, method 600 may be implemented in the form of electronic circuitry (e.g., hardware). In alternate examples of the present disclosure, at least one step of method 600 may be executed substantially concurrently or in a different order than shown in FIG. 6. In alternate examples of the present disclosure, method 600 may include more or fewer steps than are shown in FIG. 6. In some examples, at least one of the steps of method 600 may, at certain times, be ongoing and/or may repeat.

At block 604, the method may include receiving, by a memory allocator in a garbage collected system, a first free memory chunk. At block 606, the method may include creating a node to associate with the first free memory chunk and at block 608 the method may include ensuring that a first memory region containing the node will be considered to be free memory during a sweeping phase of the garbage collected system.

Figure 7:
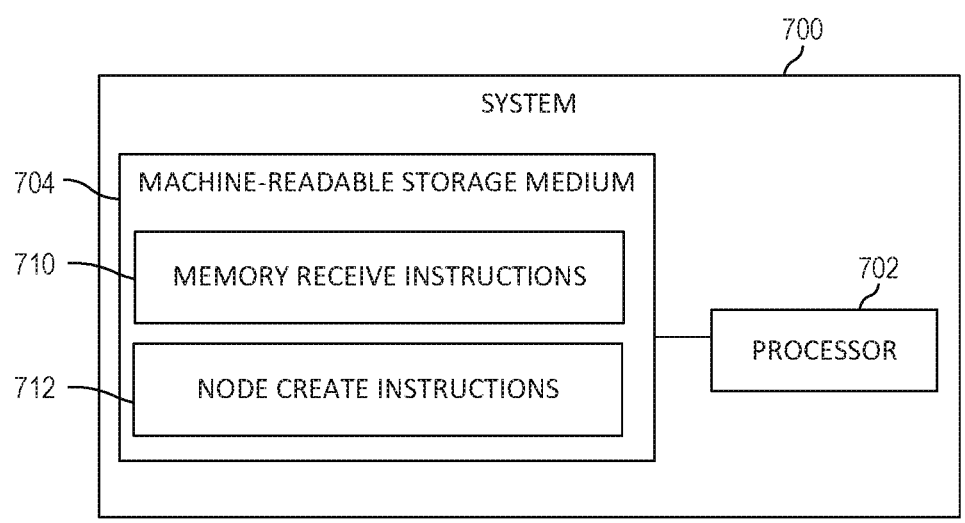
FIG. 7 is a block diagram of an example system for managing objects stored in memory.

FIG. 7 is a block diagram of an example system 700 for managing objects stored in memory. System 700 may be similar to system 100 of FIG. 1, for example. In the example illustrated in FIG. 7, system 700 includes a processor 702 and a machine-readable storage medium 704. Although the following descriptions refer to a single processor and a single machine-readable storage medium, the descriptions may also apply to a system with multiple processors and multiple machine-readable storage media. In such examples, the instructions may be distributed (e.g., stored) across multiple machine-readable storage mediums and the instructions may be distributed across (e.g., executed by) across multiple processors.

Processor 702 may be one or more central processing units (CPUs), graphics processing units (GPUs), microprocessors, and/or other hardware devices suitable for retrieval and execution of instructions stored in machine-readable storage medium 704. In the example illustrated in FIG. 6, processor 702 may fetch, decode, and execute instructions 710 and 712 for managing objects stored in memory. As an alternative or in addition to retrieving and executing instructions, processor 702 may include one or more electronic circuits comprising a number of electronic components for performing the functionality of at least one of the instructions in machine-readable storage medium 704. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 704 may be any electronic, magnetic, optical, or other physical storage device that stores executable instructions. Thus, machine-readable storage medium 704 may be, for example, Random Access Memory (RAM), an Electrically-Erasable Programmable Read-Only Memory (EEPROM), a memristor memory device, a spin-transfer torque device, a flash memory device, a storage drive, a solid state device (SSD), an optical disc, and the like. Machine-readable storage medium 804 may be disposed within system 700, as shown in FIG. 7. In this situation, the executable instructions may be "installed" on the system 700. Alternatively, machine-readable storage medium 704 may be a portable, external or remote storage medium, for example, that allows system 700 to download the instructions from the portable/external/remote storage medium. In this situation, the executable instructions may be part of an "installation package". As described herein, machine-readable storage medium 704 may be encoded with executable instructions for using pointers in a memory managed system.

Referring to FIG. 7, memory receive instructions 710, when executed by a processor (e.g., 702), may cause system 700 to receive, by a memory allocator in a garbage collected system, a first free memory chunk. Node create instructions, when executed by a processor (e.g., 702), may cause system 700 to create a node to associate with the first free memory chunk, wherein a first memory region containing the node is considered to be free memory during a sweeping phase of the garbage collected system.

The foregoing disclosure describes a number of examples for managing objects stored in memory is presented. The disclosed examples may include systems, devices, computer-readable storage media, and methods for managing objects stored in memory is presented. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   receiving, by a memory allocator in a garbage collected system, a first free memory chunk;
   creating a node to associate with the first free memory chunk, wherein creating the node comprises removing a first memory region from a second free memory chunk and storing the node in the first memory region; and
   during a sweeping phase of the garbage collected system:
      determining that a root pointer points to the node;
      determining that node information that would identify as a valid object is absent from the node; and
      recognizing, despite determining that the root pointer points to the node, the first memory region as free memory based at least in part on determining that the node information is absent from the node.

2. The method of claim 1, further comprising:
   receiving, by the memory allocator, an object allocation request; and
   returning, as a result of the request, a second memory region removed from the second free memory chunk.

3. The method of claim 1, wherein
removing the first memory region comprises changing an indication of a node allocation end of the second free memory chunk.

4. The method of claim 2, wherein
removing the second memory region comprises changing an indication of an object allocation end of the second free memory chunk.

5. The method of claim 1, wherein the node is a first node, and wherein
the memory allocator is associated with a plurality of nodes including the first node and a second node;
the first node is associated with a first set of free memory chunks and the second node is associated with a second set of free memory chunks, the first set of free memory chunks including the first free memory chunk; and
each free memory chunk in the first set of free memory chunks is associated with a first memory chunk size and each free memory chunk in the second set of free memory chunks is associated with a second memory chunk size different from the first memory size.

6. The method of claim 5, wherein
the plurality of nodes is organized as a linked list in which each node of the plurality of nodes is associated with a respective height and a respective collection of height-indexed pointers to successor elements such that each height-indexed pointer in the respective collection of height-indexed pointers points to another node whose height is at least the index height; and
the first node and the second node are associated with distinct heights.

7. The method of claim 5, comprising:
receiving, by the memory allocator, an object allocation request associated with a request size;
identifying the first node based on the request size; and
removing, from the first set of free memory chunks, the first free memory chunk, where the first memory chunk size of the first free memory chunk is greater than or equal to the request size.

8. The method of claim 7, comprising:
partitioning the first free memory chunk into a returned memory chunk and a remainder free memory chunk based on the request size and the first memory chunk size;
adding the remainder free memory chunk to the allocator; and
returning the returned memory chunk as a result of the allocation request.

9. The method of claim 8, wherein adding the remainder free memory chunk to the allocator comprises:
identifying a target node of the plurality of nodes; and
adding the remainder free memory chunk to a respective set of free memory chunks associated with the target node.

10. The method of claim 1, comprising
receiving, by the memory allocator, an object allocation request associated with a request size from an operating system thread;
attempting to satisfy the request using a thread-local allocator associated with the thread;
determining that the request cannot be satisfied using the thread-local allocator;
identifying, by the memory allocator, a memory region based on the request size;
partitioning the identified memory region into a returned memory chunk and a remainder free memory chunk based on the request size;
adding the remainder free memory chunk to the thread-local allocator; and
returning the returned memory chunk as a result of the allocation request.

11. The method of claim 1, wherein
a shared pool of memory, including the first free memory chunk, is accessible by a plurality of operating system processes and the memory allocator; and
each operating system process in the plurality of operating system processes executes its own memory allocation process.

12. The method of claim 1, wherein the memory allocator is a first memory allocator, the method comprising:
receiving an indication the garbage collected system is entering a sweep phase;
identifying a second memory allocator as a target for subsequent object allocation requests;
identifying a large free memory chunk associated with the first allocator;
expanding the large free memory chunk; and
adding the expanded free memory chunk to the second allocator.

13. The method of claim 12, wherein
a plurality of large free memory chunks are expanded by a plurality of operating system threads.

14. A non-transitory machine-readable storage medium encoded with instructions, the instructions executable by a processor of a system to cause the system to:
receive, by a memory allocator in a garbage collected system, a first free memory chunk;
create a node to associate with the first free memory chunk, wherein creating the node comprises removing a first memory region from a second free memory chunk and storing the node in the first memory region; and
during a sweeping phase of the garbage collected system:
determine that a root pointer points to the node;
determine that node information that would identify the node as a valid object is absent from the node; and
recognize, despite determining that the root pointer points to the node, the first memory region as free memory based at least in part on determining that the node information is absent from the node.

15. The non-transitory machine-readable storage medium of claim 14, wherein the instructions executable by the processor of the system further cause the system to:
receive an object allocation request; and
return a second memory region removed from the second free memory chunk.

16. The non-transitory machine-readable storage medium of claim 15, wherein the instructions executable by the processor of the system to remove the first memory region further cause the system to:
change an indication of a node allocation end of the second free memory chunk.

17. The non-transitory machine-readable storage medium of claim 15, wherein the instructions executable by the processor of the system to remove the second memory region further cause the system to:
change an indication of an object allocation end of the second free memory chunk.

18. A system comprising:
a processor; and
a memory storing executable logic comprising a memory receiver and a node creator, wherein the memory receiver is configured to receive a first free memory chunk accessible by a memory allocator in a garbage collected system, wherein the node creator is configured to create a node to associate with the first free memory chunk, wherein creating the node comprises removing a first memory region from a second free memory chunk and storing the node in the first memory region, and wherein in the executable logic is further configured, during a sweeping phase of the garbage collected system, to:

determine that a root pointer points to the node;

determine that node information that would identify the node as a valid object is absent from the node; and recognize, despite determining that the root pointer points to the node, the first memory region as free memory based at least in part on determining that the node information is absent from the node.

19. The system of claim 18, wherein the node is a first node, and wherein the memory allocator is associated with a plurality of nodes including the first node and a second node;

the first node is associated with a first set of free memory chunks and the second node is associated with a second set of free memory chunks, the first set of free memory chunks including the first free memory chunk; and each free memory chunk in the first set of free memory chunks is associated with a first memory chunk size and each free memory chunk in the second set of free memory chunks is associated with a second memory chunk size different from the first memory size.

20. The system of claim 18, wherein the plurality of nodes is organized as a linked list in which each node of the plurality of nodes is associated with a respective height and a respective collection of height-indexed pointers to successor elements such that each height-indexed pointer in the respective collection of height-indexed pointers points to another node whose height is at least the index height; and the first node and the second node are associated with distinct heights.

* * * * *